US006058384A

United States Patent [19]

Pierce et al.

[11] Patent Number: 6,058,384

[45] Date of Patent: May 2, 2000

[54] METHOD FOR REMOVING FUNDS FROM A POSTAL SECURITY DEVICE

[75] Inventors: Perry A. Pierce, Darien; Frederick W. Ryan, Jr., Oxford; Robert W. Sisson, Shelton; Kevin L. Strobel, Fairfield, all of Conn.

[73] Assignee: Pitney Bowes Inc., Stamford, Conn.

[21] Appl. No.: 08/996,602

[22] Filed: Dec. 23, 1997

[51] Int. Cl.[7] .................................................. G06F 17/00

[52] U.S. Cl. .............................................. 705/50; 705/402

[58] Field of Search ................................ 705/1, 402, 401, 705/404, 410, 408, 50; 235/375; 380/23, 25, 51

[56] References Cited

U.S. PATENT DOCUMENTS

| | | | |
|---|---|---|---|
| 4,376,299 | 3/1983 | Rivest et al. | 705/403 |
| 4,447,890 | 5/1984 | Duwel et al. | 705/403 |
| 4,649,266 | 3/1987 | Eckert | 705/408 |
| 4,787,045 | 11/1988 | Storace et al. | 705/400 |
| 4,837,701 | 6/1989 | Sansone et al. | 705/404 |
| 5,717,596 | 2/1998 | Bernard et al. | 705/404 |

*Primary Examiner*—Emanuel Todd Voeltz
*Assistant Examiner*—Thomas A. Dixon
*Attorney, Agent, or Firm*—Charles R. Malandra, Jr.; Michael E. Melton

[57] ABSTRACT

A method for removing postal funds from a postage meter provides an accounting unit of a postage meter with indicium-related information which is invalid for mailing such as invalid origin zip or date. The accounting unit generates a digital signature, which is an encrypted value of the postal funds removed from the postage meter and other postal data including the indicium-related information. The accounting unit through a Host PC sends to a data center the amount of the postal funds removed from the postage meter and the digital signature. The data center verifies that the digital signature has been generated using the indicium-related information. The meter is disabled when the digital signature cannot be verified. When the digital signature is verified a request for a refund is sent by the data center to a postal authority. An example of the indicium-related information is an invalid destination postal code or an invalid origination postal code.

14 Claims, 2 Drawing Sheets

METHOD FOR REMOVING FUNDS FROM A POSTAL SECURITY DEVICE

RELATED APPLICATIONS

The present application is related to the following U.S. patent applications Ser. Nos. 08/993,352, 08/993,353, 08/993,354, 08/993,355, 09/993,356, 08/993,357, 08/993, 358, 08/993,310 and 081993,311; all filed Dec. 18, 1997, and assigned to the assignee of the present invention.

FIELD OF THE INVENTION

The present invention relates generally to a method for removing funds from a postage meter and, more particularly, to such method for removing funds from a postal security device coupled to a personal computer.

BACKGROUND OF THE INVENTION

The Information-Based Indicia Program ("IBIP") is a distributed trusted system proposed by the United States Postal Service ("USPS") to retrofit and augment existing postage meters using new technology known as information-based indicia. The program relies on digital signature techniques to produce for each envelope an indicium whose origin cannot be repudiated and content cannot be modified. IBIP is expected to support new methods of applying postage in addition to the current approach, which typically relies on a postage meter to mechanically print indicia on mailpieces. IBIP requires printing a large, high density, two-dimensional ("2-D") bar code on a mailpiece. The 2-D bar code encodes information and is signed with a digital signature.

The USPS has published draft specifications for IBIP. The INFORMATION BASED INDICIA PROGRAM (IBIP) INDICIUM SPECIFICATION, dated Jun. 13, 1996, and revised Jul. 23, 1997, ("IBIP Indicium Specification") defines the proposed requirements for a new indicium that will be applied to mail being processed using IBIP. The INFORMATION BASED INDICIA PROGRAM POSTAL SECURITY DEVICE SPECIFICATION, dated Jun. 13, 1996, and revised Jul. 23, 1997, ("IBIP PSD Specification") defines the proposed requirements for a Postal Security Device ("PSD") that will provide security services to support the creation of a new "information based" postage postmark or indicium that will be applied to mail being processed using IBIP. The INFORMATION BASED INDICIA PROGRAM HOST SYSTEM SPECIFICATION, dated Oct. 9, 1996, defines the proposed requirements for a host system element of IBIP ("IBIP Host Specification"). The specifications are collectively referred to herein as the "IBIP Specifications". IBIP includes interfacing user (user), postal and vendor infrastructures which are the system elements of the program. The INFORMATION BASED INDICIA PROGRAM KEY MANAGEMENT PLAN SPECIFICATION, dated Apr. 25, 1997, defines the generation, distribution, use and replacement of the cryptographic keys used by the USPS product/service provider and PSDs ("IBIP KMS Specification").

The user infrastructure, which resides at the user's site, comprises a PSD coupled to a host system ("Host") with printer. The PSD is a secure processor-based accounting device that dispenses and accounts for postal value stored therein.

The IBIP Indicium Specification provides requirements for the indicium that consists of both human-readable data and PDF417 bar code data. The human-readable information includes an originating address, including the 5-digit ZIP Code of the licensing post office, PSD ID/Type number, date of mailing and amount of the applied postage. The bar code region of the indicium elements includes postage amount, PSD ID, user ID, date of mailing, originating address, destination delivery point identification, ascending and descending registers and a digital signature.

An integrated mailing system is subject to open system requirements if it includes a computer interfaced to the meter and it prepares mailpiece fronts or labels that include both the destination address and the indicium. The integrated system is an open system even if different printers apply the address and the indicium. If the mailing system satisfies such criteria, the USPS considers the "meter" to be an open system peripheral device that performs the dual functions of printing the indicia and interfacing the PSD to the Host. The integrated mailing system must be approved by the USPS according to open system criteria.

The IBIP Host Specification sets forth the requirements for a Host in an open system. The Host produces the mailpiece front including the return address (optional), the delivery address (required), the Facing Identification Mark ("FIM"), and the indicium as an integral unit. The Host may print this unit on the actual mailpiece stock or label(s) for later attachment to the mailpiece. The Host provides the user with an option to omit the FIM (e.g., when the FIM is preprinted on envelopes). The Host produces standardized addresses, including standard POSTNET delivery point bar code, for use on the mailpiece. The Host verifies each address at the time of mailpiece creation. The Host then creates the indicium and transmits it to the printer.

The IBIP Specifications define a stand-alone open metering system, referred to herein as a PC Meter or Stand-alone PC Meter. The Stand-alone PC meter has one personal computer ("PC") which operates as the Host ("Host PC"). The Host PC runs the metering application software and associated libraries (collectively referred to herein as "Host Applications" and "PC Meter Toolkit") and communicates with one or more attached PSDs. The Stand-alone PC Meter can only access PSDs coupled to the Host PC. There is no remote PSD access for the Stand-alone PC Meter.

The Stand-alone PC Meter processes transactions for dispensing postage, registration, and refill on the Host PC. Processing is performed locally between the Host and the PSD coupled thereto. Connections to a Data Center, for example for registration and refill transactions, are made locally from the Host through a local or network modem/internet connection. Accounting for debits and credits to the PSD are also performed locally, logging the transactions on the Host PC, which is the PC where the transactions are processed on and to which the PSD is attached. Thus, the accounting of funds and transaction processing are centralized on a single PC. The Host PC may accommodate more than one PSD, for example supporting one PSD per serial port. Several application programs running on the Host PC, such as a word processor or an envelope designer, may access the Host metering software.

Other configurations of open and closed system meters are described in previously noted related applications U.S. Applications Ser. Nos. [Attorney Docket E-644, E-645, E-646, E-647, E-648, E-649, E-650, E-694 and E-696].

It is expected that once IBIP is launched, the volume of meters will increase significantly when the PC-based meters are introduced. Such volume increase is expected in the small office and home office (SOHO) market. The IBIP Specifications address and resolve issues which minimize if not eliminate USPS risks regarding security and fraud. However, as with any system implemented on a non-secure device, such as a personal computer, implementation of an IBIP system may have inherent security weaknesses that could be exploited by sophisticated users intent on defrauding the USPS.

The IBIP Specifications do not specify any method for the removal of funds from the PSD, such as, safely sending funds to the Data Center when a PSD is taken out of service. Contrarily, the IBIP Host and PSD Specifications do not permit the zeroing of registers, which is common practice in current Pitney Bowes meters (except for the Personal Post Office™ digital meter as described below). It is anticipated that the removal of funds from a PSD would be accomplished using conventional methods.

Historically, mechanical postage meters that are being taken out of service have to be physically returned to the Post Office, opened and registers zeroed. This method has drawbacks, the most significant of which is the possibility of theft of an active meter and also the inconvenience of making the return.

Today, when a conventional electronic postage meter is taken out of service, a vendor service representative retrieves the postage meter from a customer, and contacts the Data Center's voice response unit or VRU. The service representative enters a special request code for zeroing the meter's registers and sends the request to the Data Center. The Data Center generates a combination code, for example, a 4 digit code as opposed to the standard 6 digit code. The service representative enters the combination code into the postage meter with an amount of "0.00" to indicate to the postage meter that a special register clear operation is to be performed. The postage meter then resets the registers of the meter to 0.

This is not a very secure method, since it relies on the customer service representative to be accurate in reading the registers and putting that information correctly into a computer or on a piece of paper for manual processing. The postage meter, however, serves as a backup to this process by holding a history of past registers in memory. The manual nature of this process can lead to potentially improper or disputed refund amounts.

In the Personal Post Office digital meter, an improvement was made to the existing process. A customer who no longer desires the product or is getting a new meter places a call to the Data Center. The Data Center, knowing that the meter is in a pending withdrawal status, sends a command to the meter requesting that a debit be made to the meter for an amount equal to that of the current descending register. The meter, upon receipt of the command, debits for the appropriate amount and generates a digital signature, also referred to herein as a token, for the mailpiece that would have been printed if the deduction was to occur on a mailpiece. The digital token and other information that would have been printed on the mailpiece are sent to the Data Center for verification to ensure that the meter properly deducted the appropriate funds. However, it should be noted that the digital token is generated in exactly the same way as for a valid mailpiece. Therefore, by intercepting, for example by listening, to the communications with the Data Center, it would be possible for an attacker to obtain valid digital tokens. These tokens and associated postal information could be imprinted on a mailpiece, thus giving the attacker free postage. The amount of free postage could be significant, e.g., for priority mail mailpiece. The attacker could also print an indicium and bring the indicium to the Post Office for a refund.

SUMMARY OF THE INVENTION

It has been found that the present invention eliminates a window of opportunity for an attacker to intercept and use information valid for postage evidencing. The present invention provides a better security method to upload postage to the Data Center in open system meters. When a PSD is taken out of service, a call is placed to the Data Center. After the client establishes contact with the Data Center, the Data Center sends a command to the client to extract the funds in the PSD. The client requests a debit from the PSD equal to the amount of the current descending register value, and supplies the PSD with an invalid destination zip code (such as "0000000000") or other invalid input data, which cannot be used to print valid mailpieces. The PSD debits the descending register, credits the ascending register and generates a digital signature using the invalid destination zip code. The digital signature is sent to the Data Center for verification that the funds have been truly extracted from the PSD.

The method of the present invention for the open system PSD would be similar to that previously described for the Personal Post Office digital meter (Data Center commanding client to debit for amount of DR, with resulting postal data sent to Data Center for verification), with the exception that the client software running on the PC would supply an invalid mailing zip such as "00000000000" or "99999999999" in the PSD's debit command. This improvement in accordance with the present invention prevents the generated PSD digital signature from being used on a mailpiece, because the destination zip code used to produce the digital signature would not match any valid destination address. A mailpiece with an invalid destination zip code would be detected during mailpiece verification by the Post Office. This could be further strengthened because the PSD could actually receive nonnumeric data (i.e.; ASCII character codes) for this process.

Other alternatives such as placing the destination zip code of the Pitney Bowes Data Center, "06926070001", are possible. This, however, is a valid mailing zip, and therefore a user could use the information to send mail to Pitney Bowes in similar fashion to the Personal Post Office digital meter method described above.

Currently, the choice of invalid destination zip code is left up to the client. Alternatively, the Data Center can supply the invalid destination zip code or other invalid data to use for the funds withdrawal rather than the client hardcoding the answer. This would allow for the Data Center to change between one or more invalid zip codes for added security.

The present invention provides a method for removing postal funds from a postage meter. The method includes providing an accounting unit of a postage meter with indicium-related information which is invalid for mailing. The accounting unit generates a digital signature, which is an encrypted value of the postal funds removed from the postage meter and other postal data including the indicium-related information. The accounting unit through a Host PC sends to a data center the amount of the postal funds removed from the postage meter and the digital signature. The data center verifies that the digital signature has been generated using the indicium-related information. The meter is disabled when the digital signature cannot be verified. When the digital signature is verified a request for a refund is sent by the data center to a postal authority. An example of the indicium-related information is an invalid destination postal code or an invalid origination postal code.

DESCRIPTION OF THE DRAWINGS

The above and other objects and advantages of the present invention will be apparent upon consideration of the following detailed description, taken in conjunction with accompanying drawings, in which like reference characters refer to like parts throughout, and in which.

DETAILED DESCRIPTION OF THE PRESENT INVENTION

Figure 1:
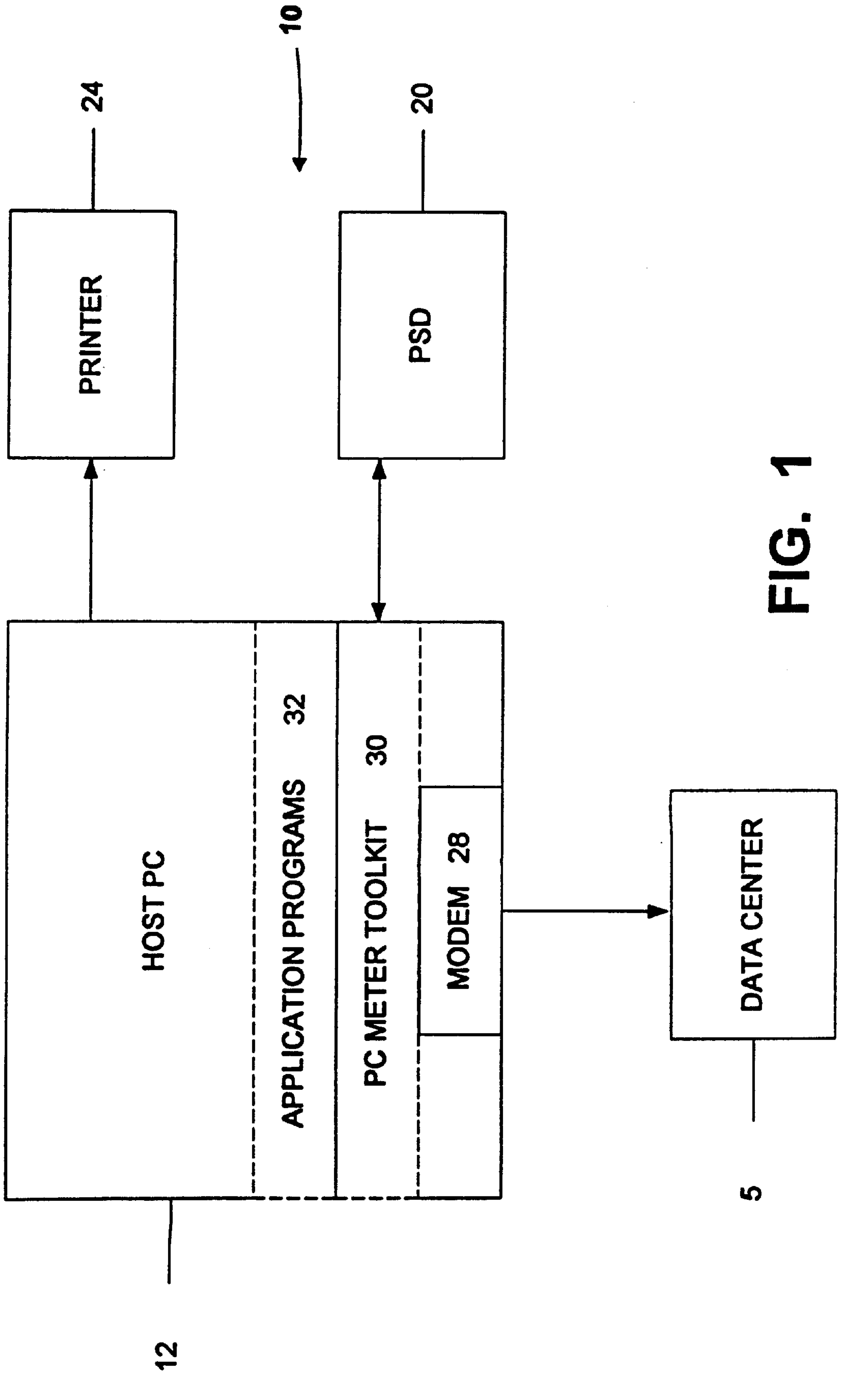
FIG. 1 is a block diagram of a prior art open metering system.

In describing the present invention, reference is made to the drawings, wherein there is seen in FIG. 1 a block diagram of an IBIP open metering system, also referred to herein as a PC meter system, generally referred to as 10. The PC meter system includes a conventional personal computer (PC) 12, including display and keyboard (not shown) configured according to the IBIP Specifications to operate as a Host PC to a peripheral metering device, i.e., the PSD, generally referred to as 20, in which postage funds are stored. Coupled to Host PC 12 is a conventional printer 24, which is preferably a laser or ink-jet printer. The IBIP open metering system 10 uses Host PC 12 and its printer 24 to print postage on envelopes at the same time it prints a recipient's address or to print labels for pre-addressed return envelopes or large mailpieces. It will be understood that although the preferred embodiment of the present invention is described as a postage metering system, the present invention is applicable to any value metering system that includes transaction evidencing using an unsecured printer.

Host PC 12 includes a conventional processor, such as the Pentium processors manufactured by Intel, and conventional hard drive, floppy drive(s), and memory. PSD 20 is a microprocessor-based secure encryption device for postage funds management, signature of postal data and traditional accounting functions. Host PC 12 also includes a modem 28 by which the Host PC communicates with a Postal Service or a Data Center 5, typically managed by a postal authenticating vendor, for recharging funds (debit or credit). In an alternate embodiment (not shown) the modem may be located in PSD 20. In yet another alternate embodiment, communication with Data Center 5 may be through the internet.

In addition to running application programs 32, Host PC 12 processes the functions for PSD registration, PSD refill, and postage dispensing transactions for PSD 20. Processing is performed locally by metering software 30 (referred to herein as "PC Meter Toolkit") running in Host PC 12. In the preferred embodiment, the PC Meter Toolkit 30 is a Component Object Model/Distributed Component object Model (COM/DCOM) object (typically implemented as a dynamic link library (DLL) or OLE control) with interfaces to perform metering operations. An example of a PC metering system using a DLL with interfaces to perform metering operations is described in previously noted U.S. patent application Ser. No. 08/575,112, filed Dec. 19, 1995, which is incorporated herein in its entirety by reference.

Figure 2:
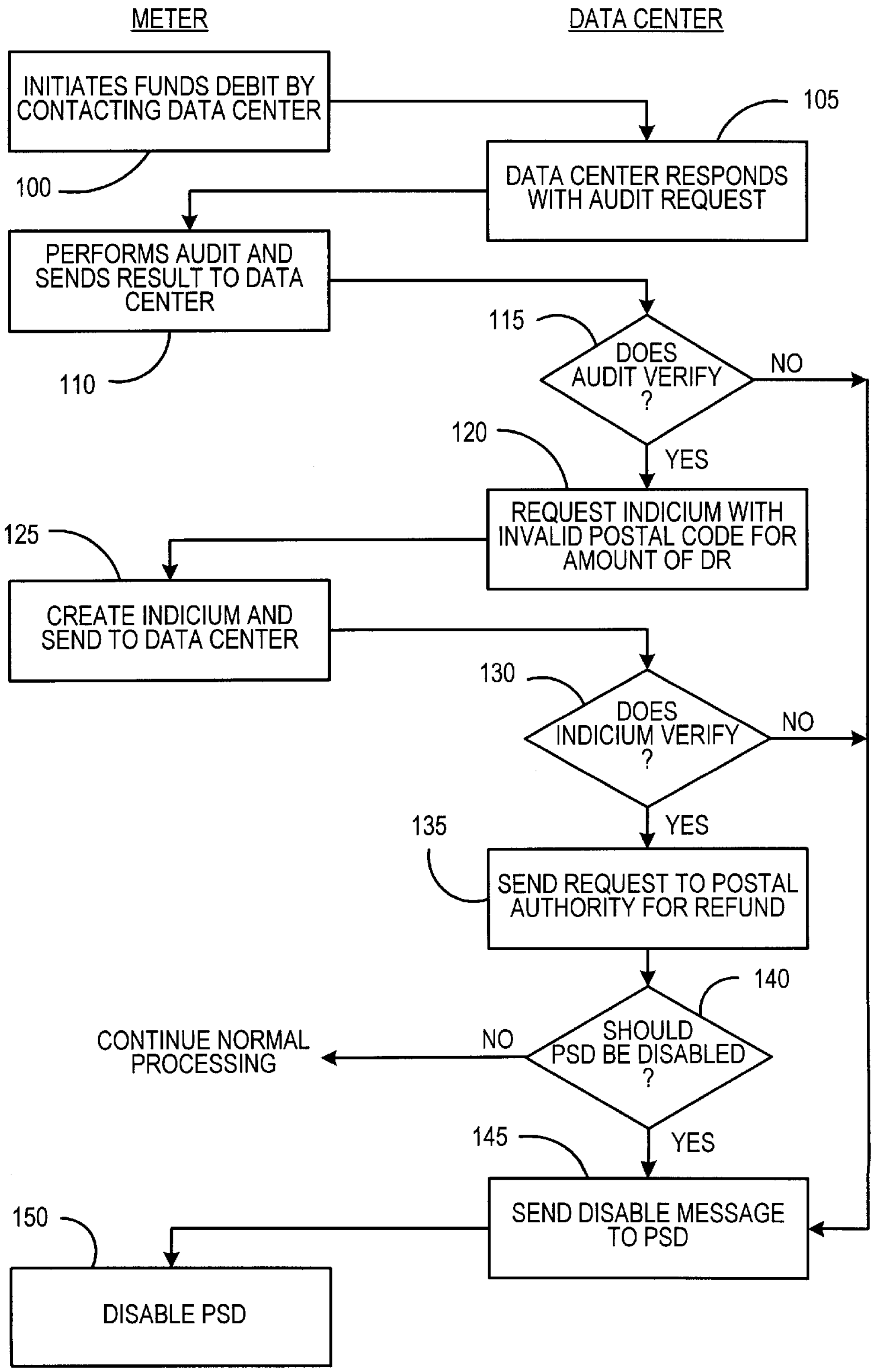
FIG. 2 is a flow chart of the process for removing funds from a PSD in accordance with the present invention.

Referring now to FIG. 2, there is seen a method for removing funds from PSD 20. At step 100, the PSD initiates a funds debit by contacting the Data Center. At step 105, the Data Center responds with an audit request. At step 110, the meter performs an audit of its registers and sends the results of the audit to the Data Center. At step 115, the Data Center verifies the results of the audit. If the results are verified, then, at step 120, the Data Center requests from the meter an indicium including a digital signature using an invalid postal code and the amount of the descending register of the PSD. In the preferred embodiment, while an invalid postal code is sent to the PSD, it should be noted that any data which would produce an indicium that is invalid for mailing could be used. For example, any data used in the generation of the digital signature or token, such as invalid origin zip or date, could be used. If the results are not verified, then, at step 145, the Data Center sends a disable message to the PSD, and at step 150, the meter is disabled.

At step 125, in response to the Data Center's request for an indicium, the meter generates an indicium and sends it to the Data Center. It is noted that the meter does not generate an indicium image in response to the Data Center's request, but does generate and send to the Data Center data that would be included in the indicium image. The steps of generating an indicium include debiting the descending register and crediting the ascending register for the amount of the funds removed from the PSD. At step 130, the Data Center determines if the received indicium can be verified. If the indicium can be verified, then, at step 135, the Data Center sends a request to the postal authority for a refund to the customer's account for an amount equal to the descending register as provided in the indicium. At step 140, The Data Center determines whether the PSD should be disabled, for example, if the descending register has been cleared. If the PSD should be disabled from step 140, or if the indicium cannot be verified at step 130, then, at step 145, the Data Center sends a disable message to the PSD, and, at step 150, the meter is disabled. If, at step 140, the meter should not be disabled, for example, if the descending registered has not been cleared as in the case of a partial refund, then the meter continues normal processing.

The present invention has been described for an open system meter, such as defined by the IBIP Specifications. It will be understood that the present invention is also suitable for closed system digital meters, such as the previously noted Personal Post Office digital meter, using invalid or Data Center-supplied origin postal or date of mailing information.

It will be understood that although the embodiment of the present invention is described for a postage metering system, the present invention is applicable to any value metering system that includes transaction evidencing, such as monetary transactions, item transactions and information transactions. Such value metering systems, for example a tax meter, would use invalid or Data Center-supplied information, such as an invalid date.

While the present invention has been disclosed and described with reference to the embodiments hereof, it will be apparent, as noted above, that variations and modifications may be made therein. It is, thus, intended in the following claims to cover each variation and modification that falls within the true spirit and scope of the present invention.

What is claimed is:

1. A method for removing postal funds from a postage meter, the method comprising the steps of:

providing the accounting unit of a postage meter with indicium-related information which is invalid for mailing;

generating a digital signature, said digital signature being an encrypted value of the postal funds removed from the postage meter and other postal data including said indicium-related information;

sending to a data center the amount of the postal funds removed from the postage meter, said other postal data including said indicium-related information and the digital signature; and verifying at the data center that the digital signature has been generated using the indicium-related information.

2. The method of claim 1 comprising the further steps of:

disabling the meter when the digital signature cannot be verified; and sending a request for a refund to a postal authority when the digital signature is verified.

3. The method of claim 1 wherein the indicium-related information is an invalid destination postal code.

4. The method of claim 1 wherein the indicium-related information is an invalid origination postal code.

5. The method of claim 1 wherein the data center provides the indicium-related information to the postage meter.

6. A method for removing funds from a transaction evidencing device, the method comprising the steps of:

providing the accounting unit of a transaction evidencing device with transaction-related information which is invalid;

generating a digital signature, said digital signature being an encrypted value of the funds removed from the transaction evidencing device and other data including said transaction-related information;

sending to a data center the amount of the funds removed from the transaction evidencing device, said other postal data including said indicium-related information and the digital signature; and the digital signature; and verifying at the data center that the digital signature has been generated using the transaction-related information.

7. The method of claim 6 comprising the further steps of:

disabling the transaction evidencing device when the digital signature cannot be verified; and sending a request for a refund to a transaction authority when the digital signature is verified.

8. The method of claim 6 wherein the transaction-related information is an invalid date.

9. The method of claim 6 wherein the transaction evidencing device is a tax meter.

10. The method of claim 6 wherein the data center provides the transaction-related information to the transaction evidencing device.

11. A method for removing postal funds from a postage meter, the method comprising the steps of:

providing the accounting unit of a postage meter with indicium-related information which is invalid for mailing;

generating an indicium, said indicium including the postal funds removed from the postage meter and said indicium-related information which is invalid for mailing;

sending said indicium to a data center:

determining if said indicium verifies; and refunding an amount equal to the postal funds removed after said indicium is verified.

12. The method of claim 1 comprising the further step of sending a request for a refund when the digital signature is verified.

13. The method of claim 11 comprising the further step of sending a request for a refund when the digital signature is verified.

14. The method of claim 11 comprising the further step of disabling the meter when the digital signature cannot be verified.

* * * * *